(12) United States Patent
Hofbeck et al.

(10) Patent No.: US 7,434,650 B2
(45) Date of Patent: Oct. 14, 2008

(54) LOCKING SYSTEM FOR A MOTOR VEHICLE AND METHOD FOR CONTROLLING SUCH A LOCKING SYSTEM

(75) Inventors: Klaus Hofbeck, Neumarkt (DE); Lorenz Pfau, Regensburg (DE); Birgit Rösel, Regensburg (DE); Arnd Stielow, Regensburg (DE); Roland Wagner, Donaustauf (DE)

(73) Assignee: Siemens Aktiengellschaft, Munich (DE)

( * ) Notice: Subject to any disclaimer, the term of this patent is extended or adjusted under 35 U.S.C. 154(b) by 436 days.

(21) Appl. No.: 11/214,579

(22) Filed: Aug. 30, 2005

(65) Prior Publication Data

US 2006/0044124 A1   Mar. 2, 2006

(30) Foreign Application Priority Data

Aug. 30, 2004   (DE) ................. 10 2004 041 879

(51) Int. Cl.
*B60K 28/12* (2006.01)
(52) U.S. Cl. ..................................................... 180/281
(58) Field of Classification Search ............... 180/281, 180/271, 273; 340/438
See application file for complete search history.

(56) References Cited

U.S. PATENT DOCUMENTS

| 4,652,768 A | * | 3/1987 | Gmeiner et al. ............. 340/438 |
| 5,602,425 A | | 2/1997 | Wilhelmi et al. |
| 5,894,906 A | * | 4/1999 | Weber ......................... 180/274 |
| 6,157,090 A | * | 12/2000 | Vogel et al. ................. 307/10.1 |
| 6,472,836 B1 | * | 10/2002 | Uebelein et al. ............ 318/445 |
| 2003/0060957 A1 | * | 3/2003 | Okamura et al. ............. 701/45 |
| 2006/0151227 A1 | * | 7/2006 | Reith .......................... 180/273 |
| 2006/0261672 A1 | * | 11/2006 | Richter ...................... 307/10.1 |

FOREIGN PATENT DOCUMENTS

| DE | 3425108 C1 | 10/1985 |
| DE | 43 39 113 A1 | 5/1995 |
| DE | 101 38 481 A1 | 2/2003 |
| WO | 1 281 583 A2 | 2/2003 |

* cited by examiner

*Primary Examiner*—Faye M. Fleming
(74) *Attorney, Agent, or Firm*—Laurence A. Greenberg; Werner H. Stemer; Ralph E. Locher

(57) ABSTRACT

A classifying seat occupancy detection device is used to classify whether a particular seat is occupied by an adult, an infant or not at all. Depending on the classification the door lock assigned to the seat is automatically switched either to a childproof mode or to a non-childproof mode, without the vehicle driver having to do anything.

12 Claims, 2 Drawing Sheets

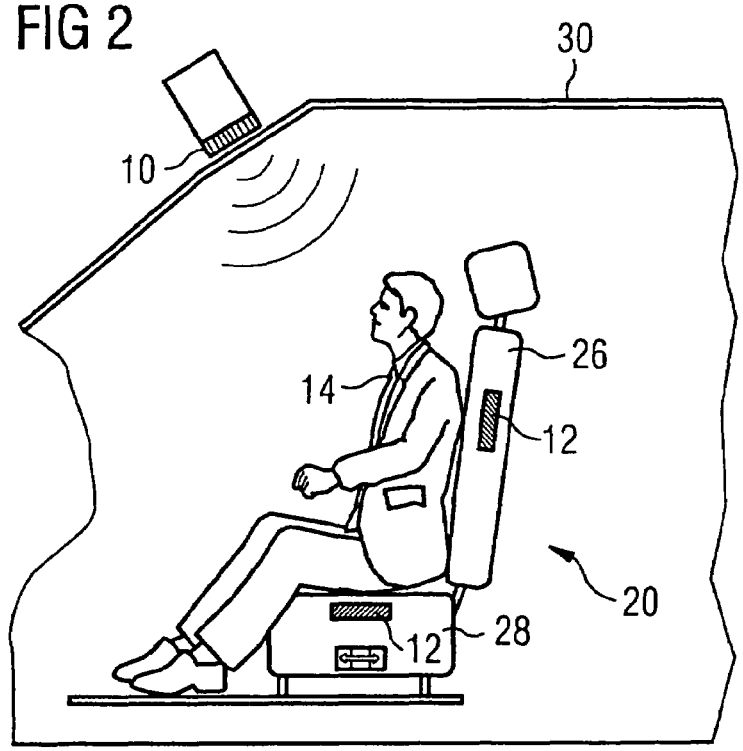
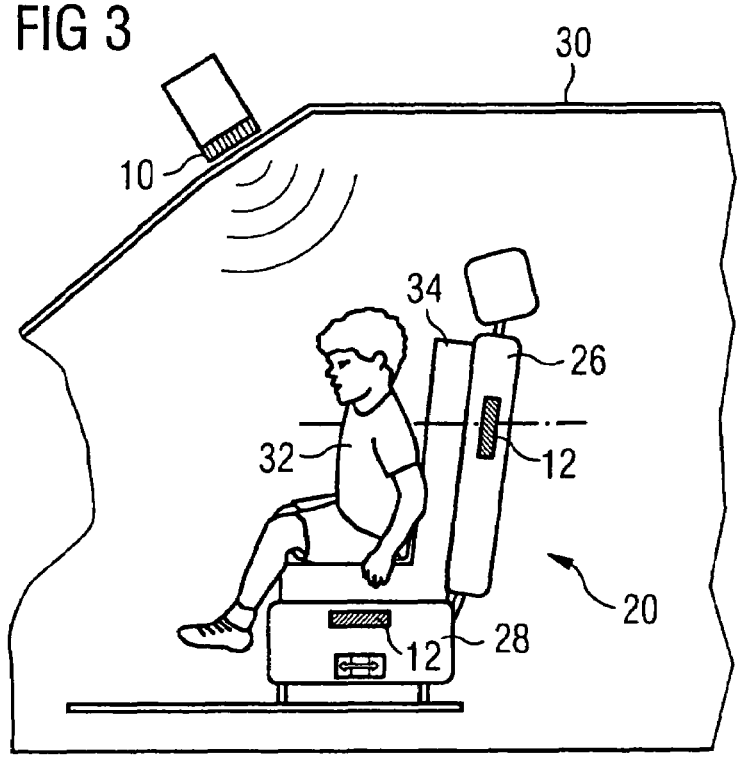

LOCKING SYSTEM FOR A MOTOR VEHICLE AND METHOD FOR CONTROLLING SUCH A LOCKING SYSTEM

BACKGROUND OF THE INVENTION

Field of the Invention

The invention relates to a locking system for a motor vehicle and a method for controlling such a locking system, in particular for a passenger vehicle.

Although applicable to any locking systems, the present invention and the problem on which it is based are explained in greater detail with reference to motor vehicle door locks with an integrated childproof safety catch.

In a motor vehicle, in particular a passenger vehicle, it is known for various measures to be taken manually or else automatically in the vehicle when a child seat is activated which promote the safety of the child and prevent undesired or dangerous actions by the child in the vehicle.

An example of this is using a childproof safety catch to bolt the door lock of the motor vehicle, i.e. the doors cannot be opened from inside the vehicle. Many versions of such vehicle door locks with childproof safety catches are known in the prior art. In the case of mechanically triggered childproof safety catch functions, i.e. functions activated manually, the childproof safety catch, which can be activated externally, is switched back and forth such that the assigned door lock is switched between a childproof status and a non-childproof status.

In such door locks with childproof safety catches it can happen that the door lock is in childproof status, although an adult is sitting on the back seat assigned to the door lock. At the end of the journey the adult is thus unable to unlock the door of the vehicle from the inside and get out of the vehicle by himself, but has to rely on assistance from someone else to unlock the door of the vehicle from the outside. This can result in dissatisfaction on the part of the customer, since traveling comfort is significantly reduced.

On the other hand it can happen that the door lock is switched to non-childproof mode even though there is no adult sitting on the back seat assigned to the door lock. As a result, an infant sitting on the back seat or an adjacent back seat instead of the adult can reach the door and can for example open it during the journey. This poses a hazard to traffic as well as to the infant sitting on the back seat.

German patent DE 34 25 108 C1, corresponding to U.S. Pat. No. 4,652,768, discloses a locking system in which the rear doors of the motor vehicle are locked remotely so as to be childproof.

However, it has been found that the drawback with this approach is the fact that the driver of the vehicle often erroneously believes that the door lock is in a particular mode, once again ultimately potentially resulting in a hazard and a lack of comfort. The driver also has to be constantly alert in this situation.

SUMMARY OF THE INVENTION

It is accordingly an object of the invention to provide a locking system for a motor vehicle and a method for controlling such a locking system which overcomes the above-mentioned disadvantages of the prior art devices and methods of this general type, in which the status of the door lock can be automatically guaranteed as a function of seat occupancy.

The idea on which the invention is based is that the locking system has at least one classifying seat occupancy detection device for detecting the seat occupancy of the individual seats in the vehicle and for classifying the persons sitting on the seats. A central control device is provided which has a data link connected to the at least one classifying seat occupancy detection device and individual door locks. The central control device in dependence on the classification of the persons sitting on the individual seats, automatically switches the door locks assigned to the respective seats to a predetermined operating mode adapted to the respective seat occupancy.

The invention thus has the advantage, compared to the known approaches in accordance with the prior art, that the driver of the vehicle does not have to worry about setting the appropriate mode for the door locks or the childproof safety catches, but that the operating mode of the door locks is adjusted fully automatically to the respective seat occupancy of the individual seats. A system of this type always automatically adjusts itself quickly and accurately in accordance with the currently prevailing occupancy situation and thus guarantees a higher level of safety and comfort.

A further advantage is that it is possible to dynamically switch the operating modes of the locks even during the journey, so that for example when the seat occupancy changes during the journey it is possible to respond automatically to such a status change in a matter of milliseconds.

According to a preferred development it is possible to switch the door lock, of which there is at least one, between a childproof mode and a non-childproof mode. The appropriate mode is selected depending on whether an adult, an infant or no one at all is sitting on the seat in question. To be able to detect this, the classifying seat occupancy detection device classifies whether any person sitting on the at least one seat is an adult or an infant.

According to a further preferred development a switchable door lock is preferably assigned to each rear door, the door locks all have a data link to the central control device and are controlled by the device.

According to a preferred embodiment the central control device switches the at least one door lock of the vehicle door assigned to the at least one seat to a non-childproof mode only if the classifying seat occupancy detection device classifies an adult on the at least one seat. If an infant or no seat occupancy is detected and classified, the door lock is switched to the childproof mode. This ensures maximum safety, since consequently opening of the door by an infant sitting on or near seats adjacent to the at least one seat is prevented. Alternatively the door locks can be continually in the non-childproof mode, without seat occupancy by an infant being classified on any of the rear seats. In this instance for example all door locks of the rear vehicle doors can be switched to the childproof mode, in order once again to guarantee maximum safety.

For example, the classifying seat occupancy detection device or devices is/are configured as a HOBBIT system (=Human Observation by Beam Interference Technology). Such a system makes it possible to classify seat occupancy simply and at low cost as regards whether an adult or an infant is sitting on the seat. Other seat occupancy detection systems, or in some cases a combination of several such systems, can of course be used.

Other features which are considered as characteristic for the invention are set forth in the appended claims.

Although the invention is illustrated and described herein as embodied in a locking system for a motor vehicle and a method for controlling such a locking system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagrammatic, side-eleational view of a classifying seat occupancy detection device in a process of detecting an adult; and FIG. 3 is a diagrammatic, side-elevational view of the classifying seat occupancy detection device in a process of detecting an infant.

DESCRIPTION OF THE PREFERRED EMBODIMENTS

Figure 1:
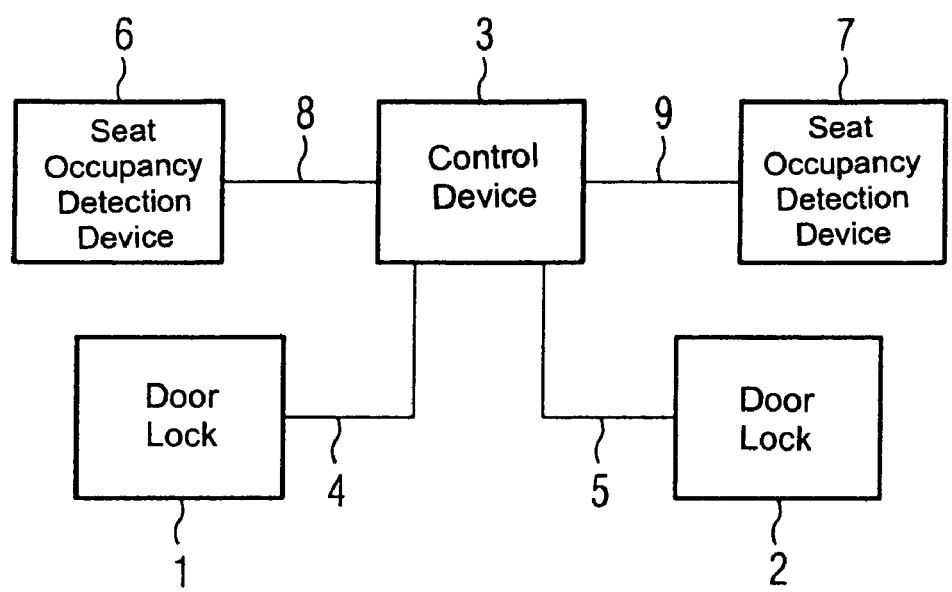
FIG. 1 is a block diagram of a locking system according to a preferred embodiment of the invention.

In the figures identical reference characters designate identical or functionally identical components, unless specified otherwise. Referring now to the figures of the drawing in detail and first, particularly, to FIG. 1 thereof, there is shown a schematic block diagram of a locking system according to a preferred embodiment of the present invention. The locking system preferably has a plurality of door locks 1, 2, each of which is assigned to a non-illustrated vehicle door. In the following, the invention is explained in greater detail on the basis of a left rear vehicle door 1 and a right rear vehicle door 2, it being obvious to a person skilled in the art that the inventive concept can of course be transferred to any motor vehicle door.

The two door locks 1 and 2 can advantageously be switched between different operating modes. According to the present embodiment a first operating mode is a childproof mode, in which the door lock cannot be unbolted from the inside to open the corresponding vehicle door. A second operating mode is for example a non-childproof mode, in which the door lock of the assigned vehicle door can be unbolted both from the outside and from the inside at any time to open the corresponding vehicle door. Other operating modes can of course be envisaged, which should be regarded as also being included in the present inventive concept.

As is also apparent in FIG. 1, the door locks 1 and 2 have a data link to a central control device 3 via suitable data links 4 and 5. The data links 4, 5 can for example be configured as a CAN bus, as a radio link or similar.

The locking system further has, as shown in FIG. 1, preferably one or more classifying seat occupancy detection devices 6, 7, used for a classifying detection of a seat occupancy of predetermined seats. The classifying seat occupancy detection devices 6, 7 are each in turn data-linked via suitable data links 8, 9 to the central control device 3. The data links 8, 9 can here in turn for example be configured as a CAN bus, as a radio link or similar.

Advantageously a separate classifying seat occupancy detection device is assigned to each seat to be examined in the motor vehicle, for example to each back seat. In the present embodiment, for example, the classifying seat occupancy detection device 6 is assigned to the left back seat and the classifying seat occupancy detection device 7 to the right back seat. Any middle back seat can of course also be assigned such a classifying seat occupancy detection device or a shared classifying seat occupancy detection device is provided for all seats.

In the following an embodiment of a development of such a classifying seat occupancy detection device 6, 7 is explained in more detail, it being obvious for a person skilled in the art that differently configured devices can be used either alone or in combination with one another.

FIGS. 2 and 3 illustrate the seat occupancy detection device 6, 7 according to a preferred embodiment of the present invention, whereby in FIG. 2 the seat is occupied by an adult 14 and in FIG. 3 by an infant 32. In the present embodiment two reflectors 12 are built into the vehicle seat 20. One reflector 12 is situated in the backrest 26 and another reflector 12 in the seat surface 28. A transmit and receive device 10, for example for transmitting and receiving microwaves, is advantageously disposed in a roof control unit 30 of the vehicle.

If an adult 14 is sitting properly on the seat, he will cover the reflectors 12, and the transmit and receive device 10 receives a signal strength several degrees of magnitude lower than if the seat 20 is empty. In this respect the classifying seat occupancy detection device shown in FIGS. 2 and 3 works on the principle of bending, attenuating and reflecting high-frequency signals.

Such a system, newly developed by the applicant, for seat occupancy detection is called a HOBBIT system. The HOBBIT system is formed of the central transmit and receive device 10 and the individual reflectors 12 in the seat for detection of any seat occupancy. The HOBBIT system usefully employs bending, attenuation and reflection of high-frequency signals (e.g. 2.45 GHz waves) in order to detect that the seats are occupied by persons. In the HOBBIT system a space covering all seats to be monitored inside a passenger compartment of a vehicle is scanned with the high-frequency electromagnetic wave field. For this purpose the transmit and receive device 10 transmits frequency-modulated signals at a frequency of for example 2.45 GHz, which hit the reflectors 12, where they are modulated, reflected and received by the transmit and receive device 10. The strength of the reflector responses received in this way is analyzed.

To this end an "attenuation thickness" is calculated, which designates the logarithm of a ratio of a sent and received strength of the respective sent and received signals. The value of the attenuation thickness is greater the lower the strength of the reflected signals received by the transmit and receive device 10. The attenuation thickness is thus a measure of the seat occupancy, so that occupancy of the seat by a person or an object can be inferred from the attenuation thickness.

Thanks to the additionally provided reflector 12 in the backrest 26 it is also possible to classify whether the seat 20 is occupied by an adult 14 or an infant 32. Because of the child seat 34, which in general absorbs the microwaves very much less than the body of the infant 32, the microwaves can, in particular because of bending characteristics, find their way between the microwave transmitter/receiver 10 and the reflectors 12 in the backrest 26 and the seat surface 28. The reflector 12 in the seat surface 28 hence receives a higher intensity if the seat is occupied by an infant 32 than if it is occupied by an adult 14 sitting directly on the seat surface 28.

Thus by suitably arranging a plurality of reflectors 12 and corresponding suitable arrangements of the transmit/receive device 10 different situations can be detected in respect of seat occupancy in the vehicle.

For example, just one transmit/receive device 10 is sufficient for all back seats or a device of this type can be provided for each back seat to be examined.

The central control device 3 receives the data received by the classifying seat occupancy detection devices 6, 7 and hence obtains information on whether the back seat 20 is occupied by an adult 14, an infant 32 or not at all. Depending on this classification the central control device 3 automatically switches the door locks 1, 2 into an operating mode adapted to the classified seat occupancy detection, it being possible to switch different locks into the same or different modes.

For example the central control device 3 always switches the door locks 1, 2 to childproof mode unless seat occupancy of the seat assigned to the respective door lock by an adult 14 is detected and classified. In this case advantageously only the vehicle door assigned to the seat or the door lock installed in the door can be switched to non-childproof mode, whereas the opposite door lock is still in childproof mode.

Alternatively, if a seat occupancy of a back seat by an infant 32 is classified, all door locks 1, 2 can be switched to childproof mode or can remain in this mode, so that opening the door is impossible, despite the possible presence of an additional adult.

If no seat occupancy of the back seats is detected, the central control device 3 can advantageously switch the door locks of the rear doors to childproof mode as a precaution.

Preferably the driver can select different switching operating modes of the system and diverse operating modes of the door locks, for example using suitable switches on an infotainment system existing in the vehicle, and adapt them to his own customer requirements.

Thus the invention creates a locking system for a motor vehicle and a method for controlling such a locking system, as a result of which the individual vehicle locks are automatically switched to a suitable mode, as a function of the seat occupancy of the individual seats, for example as a function of whether an adult, an infant or no one at all is sitting on the seat.

Although the present invention has principally been described on the basis of preferred embodiments, it is not restricted to these, but can be modified in a variety of ways.

It is obvious for a person skilled in the art that the present inventive concept-is not restricted to a motor vehicle door lock or to a motor vehicle door. For example, other functions of the motor vehicle can be controlled automatically as a function of the classified seat occupancy detection. For example, the seat belt can be controlled as a function of the classified seat occupancy detection such that in the event of a seat being occupied by a child, the child cannot undo the seat belt during the journey. In contrast, if an adult is sitting on the corresponding seat, it is possible to undo the seat belt.

Another example is automatic control of the headrests as a function of the classified seat occupancy detection. For example, if it is detected that an infant or a child is sitting on the corresponding seat, the headrests are automatically lowered, to create a maximum field of vision for the driver of the motor vehicle. In contrast, if an adult is sitting on the corresponding seat, the headrests are automatically raised.

This application claims the priority, under 35 U.S.C. § 119, of German patent application No. 10 2004 041 879.9, filed Aug. 30, 2004; the entire disclosure of the prior application is herewith incorporated by reference.

We claim:

1. A locking system for a motor vehicle, the locking system comprising:
    at least one door lock disposed on a vehicle door and associated with at least one seat, said at least one door lock being switchable between a first mode in which said at least one door lock cannot be unlocked from inside the vehicle and a second mode in which said at least one door lock can be unlocked from inside the vehicle;
    at least one classifying seat occupancy detection device for detecting a seat occupancy of the at least one seat and for classifying a person sitting on the at least one seat; and
    a central control device having a data link connected to said at least one classifying seat occupancy detection device and said at least one door lock, and in dependence on a classification of the person sitting on the at least one seat automatically switches said at least one door lock to said first mode or said second mode.

2. The locking system according to claim 1, wherein said classifying seat occupancy detection device classifies whether the person sitting on said at least one seat is an adult or an infant.

3. The locking system according to claim 1, wherein said at least one door lock is assigned to a rear vehicle door.

4. The locking system according to claim 1, wherein said central control device switches said at least one door lock of the vehicle door assigned to the at least one seat to said second mode only if said classifying seat occupancy detection device classifies an adult on the at least one seat.

5. The locking system according to claim 1, wherein said central control device switches all door locks of rear vehicle doors to said first mode if said classifying seat occupancy detection device classifies an infant on the at least one seat.

6. The locking system according to claim 1, wherein said central control device switches said at least one door lock of the vehicle door assigned to the at least one seat to said first mode if said classifying seat occupancy detection device detects no seat occupancy of the at least one seat.

7. The locking system according to claim 1, wherein said at least one classifying seat occupancy detection device includes a transmit/receive device transmitting a frequency modulated signal and at least one reflector reflecting the signal back to said transmit/receive device.

8. A method for controlling a locking system of a motor vehicle, which comprises the steps of:
    detecting a seat occupancy of at least one seat and classifying a person sitting on the at least one seat using at least one classifying seat occupancy detection device; and
    switching at least one door lock, which is provided on a vehicle door associated with the at least one seat, to a first mode or to a second mode in dependence on a classification of the person sitting on the at least one seat using a central control device having a data link connected to the classifying seat occupancy detection device and to the at least one door lock;
    the first mode being a mode in which the at least one door lock cannot be unlocked from inside the vehicle and the second mode being a mode in which the at least one door lock can be unlocked from inside the vehicle.

9. The method according to claim 8, which further comprises classifying, via the classifying seat occupancy detection device, whether the person sitting on the at least one seat is an adult or an infant.

10. The method according to claim 8, wherein the central control device performs the step of switching the at least one door lock of the vehicle door assigned to the at least one seat to the second mode only if the classifying seat occupancy detection device classifies an adult on the at least one seat.

11. The method according to claim 8, wherein the central control device performs the step of switching all door locks of rear vehicle doors to the first mode if the classifying seat occupancy detection device classifies an infant on the at least one seat.

12. The method according to claim 8, wherein the central control device performs the step of switching the at least one door lock of the vehicle door assigned to the at least one seat to the first mode if the classifying seat occupancy detection device does not detect any seat occupancy of the at least one seat.

* * * * *